United States Patent
Lee et al.

(10) Patent No.: US 10,696,585 B2
(45) Date of Patent: Jun. 30, 2020

(54) METHOD OF TREATING GLASS SUBSTRATE

(71) Applicant: Samsung Display Co., Ltd., Yongin-si, Gyeonggi-do (KR)

(72) Inventors: Hoikwan Lee, Suwon-si (KR); Seung Kim, Seongnam-si (KR); Seungho Kim, Asan-si (KR); Cheolmin Park, Hwaseong-si (KR); Eun-kyung Yeon, Suwon-si (KR); Jong-hoon Yeum, Seoul (KR); Jeongseok Lee, Osan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 33 days.

(21) Appl. No.: 15/661,709

(22) Filed: Jul. 27, 2017

(65) Prior Publication Data

US 2018/0037497 A1 Feb. 8, 2018

(30) Foreign Application Priority Data

Aug. 2, 2016 (KR) .......................... 10-2016-0098611

(51) Int. Cl.
*C03C 21/00* (2006.01)
(52) U.S. Cl.
CPC .................................. *C03C 21/002* (2013.01)
(58) Field of Classification Search
None
See application file for complete search history.

(56) References Cited

U.S. PATENT DOCUMENTS

| 3,628,983 | A | * | 12/1971 | Leger | ..................... | C03C 17/00 |
| | | | | | | 427/279 |
| 6,114,039 | A | * | 9/2000 | Rifqi | ..................... | C03C 21/002 |
| | | | | | | 428/141 |
| 9,023,421 | B2 | * | 5/2015 | Nakashima | ............. | C03C 3/091 |
| | | | | | | 427/128 |
| 2006/0075783 | A1 | * | 4/2006 | Kim | ..................... | C03C 21/008 |
| | | | | | | 65/60.5 |
| 2007/0141349 | A1 | * | 6/2007 | Hessenkemper | ...... | C03C 21/001 |
| | | | | | | 428/410 |
| 2009/0142484 | A1 | * | 6/2009 | Isono | ..................... | C03C 21/001 |
| | | | | | | 427/127 |

(Continued)

FOREIGN PATENT DOCUMENTS

KR 10-2013-0061172 A 6/2013
KR 10-1335462 B1 11/2013

(Continued)

OTHER PUBLICATIONS

National Center for Biotechnology Information. PubChem Compound Database; CID=24434, Potassium Nitrate, https://pubchem.ncbi.nlm.nih.gov/compound/24434 (accessed Oct. 25, 2018). (Year: 2018).*

(Continued)

*Primary Examiner* — Lisa L Herring
(74) *Attorney, Agent, or Firm* — Lewis Roca Rothgerber Christie LLP (57) ABSTRACT

A method of treating a glass substrate includes providing a glass substrate and strengthening the glass substrate by providing a mixed molten salt including a strengthening molten salt and an aluminum salt to the glass substrate.

8 Claims, 4 Drawing Sheets

(56) References Cited

U.S. PATENT DOCUMENTS

| | | | |
|---|---|---|---|
| 2010/0035038 A1* | 2/2010 | Barefoot | C03C 3/064 |
| | | | 428/220 |
| 2012/0085130 A1* | 4/2012 | Hill | C03B 25/08 |
| | | | 65/30.14 |
| 2014/0309099 A1* | 10/2014 | Naylor | C03C 3/087 |
| | | | 501/71 |
| 2015/0239775 A1* | 8/2015 | Amin | C03C 21/002 |
| | | | 428/220 |
| 2015/0248910 A1* | 9/2015 | Itaya | G11B 5/73 |
| | | | 428/836 |
| 2015/0376050 A1* | 12/2015 | Nakamura | C03C 3/087 |
| | | | 428/410 |
| 2017/0197869 A1* | 7/2017 | Beall | C03C 3/097 |
| 2017/0204002 A1* | 7/2017 | Huang | C03C 21/002 |

FOREIGN PATENT DOCUMENTS

| | | |
|---|---|---|
| KR | 10-2015-0077089 A | 7/2015 |
| KR | 10-2016-0014581 A | 2/2016 |
| KR | 10-1662627 B1 | 10/2016 |
| KR | 10-2017-0113976 | 10/2017 |

OTHER PUBLICATIONS

National Center for Biotechnology Information. PubChem Compound Database; CID=24502, Potassium Dichromate, https://pubchem.ncbi.nlm.nih.gov/compound/24502 (accessed Oct. 25, 2018) (Year: 2018).*

National Center for Biotechnology Information. PubChem Compound Database; CID=24012, Aluminum Trichloride, https://pubchem.ncbi.nlm.nih.gov/compound/24012 (accessed Oct. 25, 2018) (Year: 2018).*

Varshneya, A. K. et al.; "Ion Exchange in Sodium Borosilicate Glasses"; Journal of the American Ceramic Society; vol. 57; No. 4; Apr. 1974; pp. 165-169.

* cited by examiner

METHOD OF TREATING GLASS SUBSTRATE

CROSS-REFERENCE TO RELATED APPLICATION

This patent application claims priority to, and the benefit of, Korean Patent Application No. 10-2016-0098611, filed on Aug. 2, 2016 in the Korean Intellectual Property Office, the entire content of which is hereby incorporated by reference.

BACKGROUND

1. Field

Aspects of embodiments of the present disclosure relate to methods of treating a glass substrate.

2. Description of the Prior Art

A glass substrate is variously used in a liquid crystal display, a plasma display panel, and an organic light-emitting display. For example, the glass substrate is used as a substrate of display panels used in the manufacture of televisions, computer monitors, and portable terminals, and may also be used as cover glass that protects the display panel of a display device.

Weight reduction and thinning of a glass substrate used in a display device have been pursued. Also, improving the strength of the glass substrate has been studied. A physical strengthening method and a chemical strengthening method using an ion exchange principle have been used to strengthen the glass substrate.

SUMMARY

Embodiments of the present disclosure provide a method of treating a glass substrate to improve strength properties and surface hardness thereof.

Embodiments of the present disclosure also provide a method of treating a glass substrate to improve surface hardness thereof without reducing strength properties thereof.

An embodiment of the inventive concept provides a method of treating a glass substrate including: providing a glass substrate; and strengthening the glass substrate by providing a mixed molten salt including a strengthening molten salt and an aluminum salt to the glass substrate.

In an embodiment, the aluminum salt may include at least one of an aluminum nitrate, an aluminum sulfate, and an aluminum chloride.

In an embodiment, the strengthening molten salt may be a single salt of $Li^+$, $Na^+$, $Rb^+$, or $Cs^+$.

In an embodiment, an amount of the aluminum salt in the mixed molten salt may be 100 ppm to 1,000 ppm based on a weight of the strengthening molten salt.

In an embodiment, the method may further include heat treating the glass substrate before the strengthening of the glass substrate.

In an embodiment, the heat treating may be performed above a strain point of the glass substrate and below an annealing point of the glass substrate.

In an embodiment, the heat treating may be performed by dipping the glass substrate in a melt.

In an embodiment, the melt may include at least one of an alkali nitrate, an alkali sulfate, and an alkali chloride.

In an embodiment, the glass substrate may include 50 wt % to 80 wt % of $SiO_2$, 3 wt % to 20 wt % of $Al_2O_3$, and 10 wt % to 30 wt % of $Na_2O$.

In an embodiment of the inventive concept, a method of treating a glass substrate includes providing a glass substrate; strengthening the glass substrate by providing a strengthening molten salt to the provided glass substrate; and surface treating the glass substrate by providing an aluminum salt to the glass substrate.

In an embodiment, the aluminum salt may include an aluminum nitrate, an aluminum sulfate, or an aluminum chloride.

In an embodiment, the strengthening molten salt may be a single salt of $Li^+$, $Na^+$, $K^+$, $Rb^+$, or $Cs^+$.

In an embodiment, the strengthening molten salt may be maintained at a first temperature, and the aluminum salt may be maintained at a second temperature that may be below the first temperature.

In an embodiment, the second temperature may be above a melting point of the aluminum salt and below a melting point of the strengthening molten salt.

In an embodiment, the first temperature may be in a range of 350° C. to 500° C.

In an embodiment, the second temperature may be in a range of 150° C. to 350° C.

In an embodiment, the method may further include heat treating the glass substrate before the strengthening of the glass substrate.

In an embodiment, the heat treating may be performed by dipping the glass substrate in a melt.

In an embodiment, the heat treating may be performed in a temperature range of 500° C. to 550° C.

In an embodiment, the glass substrate may include 50 wt % to 80 wt % of $SiO_2$, 3 wt % to 20 wt % of $Al_2O_3$, and 10 wt % to 30 wt % of $Na_2O$.

BRIEF DESCRIPTION OF THE DRAWINGS

The accompanying drawings are included to provide a further understanding of the inventive concept and are incorporated in, and constitute a part of, this specification. The drawings illustrate exemplary embodiments of the inventive concept and, together with the description, serve to explain aspects of the inventive concept. In the drawings.

DETAILED DESCRIPTION

While embodiments of the present invention are amenable to various modifications and alternative forms, exemplary embodiments thereof have been shown in the drawings and are described, in detail, below. The present invention is not limited to the particular embodiments described herein. The present invention covers all modifications, equivalents, and alternatives falling within the scope of the present invention as defined by the appended claims and their equivalents.

In the drawings, like numbers refer to like elements throughout, and the dimensions of structures, layers, etc. may be exaggerated for clarity. It will be understood that, although the terms first, second, etc. may be used herein to describe various elements, these elements should not be limited by these terms. These terms are used to distinguish one element from another element. For example, a first element could be termed a second element, and, similarly, a second element could be termed a first element, without departing from the scope of the inventive concept. Terms having a singular form may include plural forms unless referred to the contrary.

It will be further understood that the terms "includes," "including," "comprises," and "comprising," when used in this specification, specify the presence of stated features, integers, steps, operations, elements, components, or combinations thereof but do not preclude the presence or addition of one or more other features, integers, steps, operations, elements, components, or combinations thereof. Also, it will be understood that when an element, such as a layer, film, region, or substrate, is referred to as being "on" another element, it can be directly on the other element or intervening elements may also be present therebetween. When an element, such as a layer, film, region, or substrate, is referred to as being "under" another element, it may be directly under the other element or intervening elements may also be present. Furthermore, exemplary terms, such as "above," "below," etc., can encompass both an orientation of above and below.

As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Hereinafter, a method of treating a glass substrate according to embodiments of the inventive concept will be described with reference to the accompanying drawings.

Figure 1:
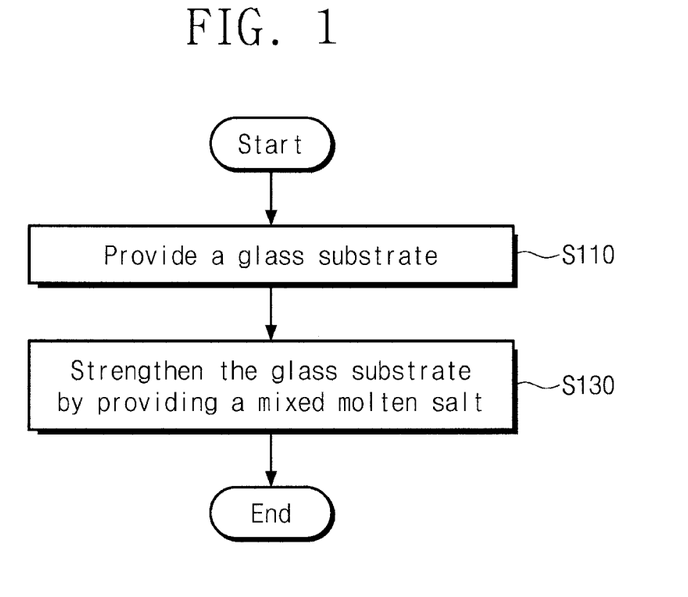
FIG. 1 is a flowchart illustrating a method of treating a glass substrate according to an embodiment of the inventive concept.
Figure 2:
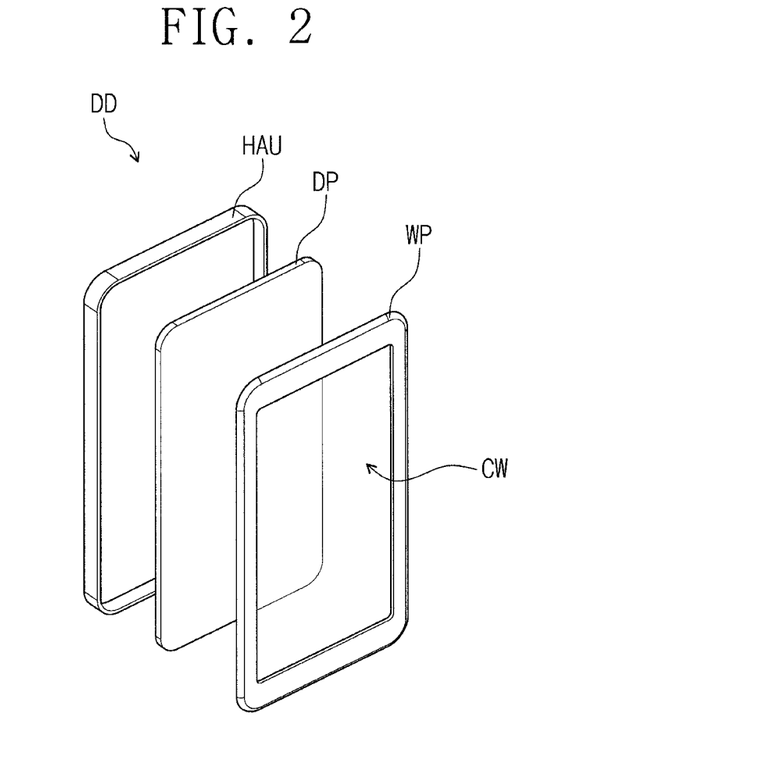
FIG. 2 illustrates an embodiment of a display device including a glass substrate treated according to the embodiment of the method of treating a glass substrate illustrated in FIG. 1.

FIG. 1 is a flowchart schematically illustrating a method of treating a glass substrate according to an embodiment of the inventive concept. FIG. 2 illustrates an embodiment of a display device including a glass substrate treated according to the embodiment of the method of treating a glass substrate illustrated in FIG. 1.

Referring to FIG. 1, the method of treating a glass substrate according to an embodiment of the inventive concept includes providing a glass substrate (S110) and strengthening the glass substrate by providing a mixed molten salt (S130).

The providing of the glass substrate (S110) may include preparing the glass substrate for performing a strengthening treatment. The provided glass substrate may be used in the manufacture of a display device. For example, the provided glass substrate may be used in a portable display device, such as in a smartphone, or in a medium-sized or large-sized display device, such as in a TV, a notebook, and a monitor.

In some embodiments, the glass substrate may be a cover glass that is disposed on a display panel to protect the display panel. However, the inventive concept is not limited thereto, and the provided glass substrate may be variously used.

A display device DD shown in FIG. 2 may include a display panel DP, a housing member HAU, which accommodates the display panel DP, and a window member WP on the display panel DP. The display device DD shown in FIG. 2 may be a portable display device, but the inventive concept is not limited thereto. For example, the glass substrate processed according to the embodiment of the method of treating a glass substrate illustrated in FIG. 1 may be used as cover window CW included in the window member WP.

In the method of treating a glass substrate according to an embodiment of the inventive concept, the provided glass substrate may be prepared by a float process. Also, the provided glass substrate may be prepared by a downdraw process or by a fusion process. However, the inventive concept is not limited thereto, and the provided glass substrate may be prepared according to various suitable processes or methods.

In consideration of use, the provided glass substrate may be cut before the strengthening of the glass substrate (S130). However, the inventive concept is not limited thereto. For example, the provided glass substrate may have a size that does not match a size of a final product and may be cut into the size of the final product after a process of treating the glass substrate according to an embodiment of the inventive concept.

The glass substrate may be flat (or substantially flat). In some embodiments, the glass substrate may be bent. For example, the glass substrate may be concavely or convexly bent about a middle portion. Furthermore, the glass substrate may include a bent portion at an outer peripheral portion thereof. However, the inventive concept is not limited thereto, and the glass substrate may be provided in various suitable shapes.

The glass substrate may be an alkali aluminosilicate glass substrate or may be a soda-lime-silicate glass substrate. For example, when the glass substrate is used as the cover glass CW included in the window member WP in the display device DD illustrated in FIG. 2, the glass substrate may be the alkali aluminosilicate glass substrate or the soda-lime-silicate glass substrate. However, the inventive concept is not limited thereto.

The provided glass substrate may include silicon oxide (e.g., $SiO_2$), aluminum oxide (e.g., $Al_2O_3$), and/or sodium oxide (e.g., $Na_2O$). For example, the glass substrate may include about 50 wt % to about 80 wt % of $SiO_2$, about 3 wt % to about 20 wt % of $Al_2O_3$, and about 10 wt % to about 30 wt % of $Na_2O$. Also, the glass substrate may further include an additive and/or an oxide in addition to the $SiO_2$, $Al_2O_3$, and/or $Na_2O$.

For example, the provided glass substrate may further include potassium oxide (e.g., $K_2O$), magnesium oxide (e.g., MgO), and calcium oxide (e.g., CaO) in addition to the $SiO_2$, $Al_2O_3$, and/or $Na_2O$. In the glass substrate, about 2 wt % or less of $K_2O$, about 9 wt % or less of MgO, and about 1 wt % or less of CaO may be included. In one embodiment, the provided glass substrate may include about 50 wt % to about 80 wt % of $SiO_2$, about 3 wt % to about 10 wt % of $Al_2O_3$, about 10 wt % to about 30 wt % of $Na_2O$, about 2 wt % or less of $K_2O$, about 9 wt % or less of MgO, and about 1 wt % or less of CaO.

A strain point of the glass substrate, such as the alkali aluminosilicate glass substrate or the soda-lime-silicate glass substrate, may be in a range of about 400° C. to about 700° C., and an annealing point of the glass substrate may be in a range of about 450° C. to about 750° C.

In the method of treating a glass substrate according to an embodiment of the inventive concept, the strengthening of the glass substrate (S130) may include treating the glass substrate by providing a mixed molten salt to the glass substrate. For example, the strengthening of the glass substrate (S130) may include strengthening the glass substrate by a chemical strengthening method. In some embodiments, the mixed molten salt may include a strengthening molten salt and/or an aluminum salt.

The chemical strengthening of the glass substrate may improve the strength of a surface of the glass substrate due to ion exchange that occurs on the surface of the glass substrate. For example, the surface of the glass substrate may be subjected to a strengthening treatment according to an ion exchange method (or ion exchange principle). For example, the strengthening of the glass substrate according to the ion exchange method may be performed by exchanging an alkali metal ion having a relatively small ionic radius on the surface of the glass substrate with an alkali metal ion having a larger ionic radius. For example, surface strengthening may be performed by exchanging $Na^+$ ions (sodium ions) on the surface of the glass substrate with $K^+$ ions (potassium ions). The strengthened glass substrate may include a compressive stress layer on the surface thereof.

The mixed molten salt provided in the strengthening of the glass substrate (S130) may include a strengthening molten salt. The strengthening molten salt may be a single salt formed of a single material or a mixed salt including two or more materials.

In an embodiment in which the strengthening molten salt is a single salt, the strengthening molten salt may include lithium ions ($Li^+$), sodium ions ($Na^+$), potassium ions ($K^+$), rubidium ions ($Rb^+$), or cesium ions ($Cs^+$). For example, the strengthening molten salt may be a single salt of lithium nitrate (e.g., $LiNO_3$), sodium nitrate (e.g., $NaNO_3$), potassium nitrate (e.g., $KNO_3$), lithium sulfate (e.g., $Li_2SO_4$), sodium sulfate (e.g., $Na_2SO_4$), or potassium sulfate (e.g., $K_2SO_4$). In one embodiment, the strengthening molten salt may be $KNO_3$.

In an embodiment in which the strengthening molten salt is a mixed salt, the strengthening molten salt may include a plurality of kinds of ions including $Li^+$, $Na^+$, $K^+$, $Rb^+$, and/or $Cs^+$. For example, the mixed salt may include two or more salts selected from $LiNO_3$, $NaNO_3$, $KNO_3$, $Li_2SO_4$, $Na_2SO_4$, or $K_2SO_4$.

In an embodiment, the mixed salt may include an aluminum salt. The aluminum salt may be a salt which is dissolved in a melting temperature range of the mixed molten salt to provide aluminum ions. For example, the aluminum salt may include aluminum nitrate ($Al(NO_3)_3$), aluminum sulfate ($Al_2(SO_4)_3$), and/or aluminum chloride ($Al(Cl)_3$).

The method of treating a glass substrate according to an embodiment of the inventive concept may not only strengthen the glass substrate but may also improve the hardness of the surface of the glass substrate by providing the aluminum salt as well as the strengthening molten salt in the strengthening of the glass substrate (S130). For example, scratch resistance of the surface of the glass substrate may be improved by performing a strengthening process by using the mixed molten salt including the aluminum salt.

The aluminum salt in the mixed molten salt provided in the strengthening of the glass substrate (S130) may be included in an amount of about 100 ppm (parts per million) to about 1,000 ppm based on a weight of the strengthening molten salt. If the amount of the aluminum salt is less than about 100 ppm, the surface hardness of the glass substrate may not be improved due to the low amount of the aluminum salt in the mixed salt. If the amount of the aluminum salt is greater than about 1,000 ppm, the strength properties of the glass substrate may be deteriorated (or might not be improved). For example, if the amount of the aluminum salt is greater than about 1,000 ppm, formation of the compressive stress layer on the surface of the glass substrate may be inhibited.

The strengthening of the glass substrate by providing the mixed molten salt (S130) may be performed in a melting temperature range of the strengthening molten salt. For example, the strengthening of the glass substrate (S130) may be performed in a temperature range of about 350° C. to about 500° C. For example, the strengthening of the glass substrate (S130) may be performed in a temperature range of about 450° C. to about 480° C. (e.g., the strengthening of the glass substrate (S130) may be performed when the mixed molten salt has a temperature of about 450° C. to about 480° C.).

The strengthening of the glass substrate (S130) may be divided into a plurality of processes. For example, the strengthening of the glass substrate (S130) may include multiple strengthening processes. In other embodiments, however, the strengthening of the glass substrate (S130) may be a single strengthening process. For example, in an embodiment in which the strengthening of the glass substrate (S130) includes multiple strengthening processes, a strengthening molten salt (e.g., a configuration of, or physical properties of, the strengthening molten salt) used in each strengthening process may be different from each other. However, the inventive concept is not limited thereto, and the strengthening molten salt used in each of the strengthening processes may be the same or substantially the same, or the strengthening molten salts used in some of the strengthening processes may be different from each other.

The method of treating a glass substrate according to an embodiment of the inventive concept may further include heat treating the glass substrate before the strengthening of the glass substrate (S130). The heat treating may be performed above the strain point and below the annealing point of the glass substrate. For example, the heat treating may be performed in a temperature range of about 500° C. to about 550° C.

The heat treating may be performed by disposing the glass substrate in a chamber under high-temperature gas-phase conditions, or may be performed by dipping the glass substrate in a liquid-phase melt. The method of treating a glass substrate according to an embodiment of the inventive concept that includes the heat treating before the strengthening of the glass substrate may modify surface properties of the glass substrate and may increase internal density of the glass substrate (e.g., may increase an internal structure density of the glass substrate).

Also, in an embodiment in which the heat treating is performed by dipping the glass substrate in the melt, the entire glass substrate may be substantially uniformly heated regardless of the shape of the glass substrate because the entire glass substrate is dipped in the high-temperature liquid-phase melt. Thus, the glass substrate that is heat-treated by being dipped in the melt may have overall uniform (or substantially uniform) physical properties.

The melt for the heat treating may include an alkali nitrate, an alkali sulfate, and/or an alkali chloride. In one embodiment, the melt may include an alkali nitrate including an alkali metal ion, an alkali sulfate including an alkali metal ion, an alkali nitrate including an alkaline earth metal ion, an alkali sulfate including an alkaline earth metal ion, and/or an alkali chloride including an alkali metal ion.

The alkali nitrate included in the melt may be $LiNO_3$, $NaNO_3$, $KNO_3$, $RbNO_3$, $CsNO_3$, $Ba(NO_3)_2$, and/or $Sr(NO_3)_2$. The alkali sulfate included in the melt may be $Li_2SO_4$, $Na_2SO_4$, $K_2SO_4$, $Rb_2SO_4$, $Cs_2SO_4$, $BaSO_4$, and/or $SrSO_4$. The melt may also include the alkali chloride, and the alkali chloride may be LiCl, NaCl, and/or KCl.

For example, the melt used in the heat treating may include the alkali nitrate, the alkali sulfate, and/or the alkali chloride, and, because these compounds may be melted, these compounds may be in a liquid phase (e.g., may be in a liquid phase during the heat treating). For example, the melt may include $LiNO_3$, $NaNO_3$, $KNO_3$, $RbNO_3$, $CsNO_3$, $Ba(NO_3)_2$, $Sr(NO_3)_2$, $Li_2SO_4$, $Na_2SO_4$, $K_2SO_4$, $Rb_2SO_4$, $Cs_2SO_4$, $BaSO_4$, $SrSO_4$, LiCl, NaCl, and/or KCl.

A temperature of the melt during the heat treating may be maintained at a temperature that is about 100° C. to about 150° C. higher than the temperature of the mixed molten salt used in the strengthening of the glass substrate (S130). The strengthening of the glass substrate (S130) may be performed at a temperature that is lower than the strain point of the glass substrate. For example, the heat treating may be performed in a temperature range of about 500° C. to about 550° C.

The alkali metal ion of the melt used in the heat treating, and the alkali metal ion of the strengthening molten salt provided in the strengthening of the glass substrate (S130), may be different from each other. For example, when the melt includes $NaNO_3$, the strengthening molten salt may be a single salt or may be a mixed salt including an alkali metal cation other than a $Na^+$ ion. For example, when the melt includes $NaNO_3$, the strengthening molten salt may include (e.g., may only include, or may primarily include) $KNO_3$ as the salt. For example, in the strengthening of the glass substrate (S130), an ion that has a larger ionic radius than that of the alkali metal ion included in the melt that is used during the heat treating of the glass substrate may be included in the strengthening molten salt.

The method of treating a glass substrate according to an embodiment of the inventive concept may further include cooling the glass substrate after the heat treating. Also, the method may further include, after the cooling, cleaning the glass substrate and/or drying the glass substrate.

Table 1 illustrates values of surface properties of the glass substrate treated by using the method of treating a glass substrate according to the embodiment of the inventive concept illustrated in FIG. 1. The higher the surface strength value of the glass substrate illustrated in Table 1, the higher the surface hardness may be. The strength values listed in Table 1 were measured by a MIT (Micro Indentation Tester, manufactured by Anton Paar GmbH) as a hardness tester. A test specimen having a size of about 25 mm×about 25 mm was treated by the method of treating a glass substrate according to the embodiment of the inventive concept illustrated in FIG. 1. A load of about 2N was applied for about 10 seconds using a measurement tip (e.g., a Vickers tip), and surface strength of the specimen was then measured.

TABLE 1

| Measurement depth (nm) | Surface Strength (Comparative Example) | Surface Strength (Embodiment) |
| --- | --- | --- |
| 50 nm | 555 MPa | 590 MPa |
| 300 nm | 534 MPa | 743 MPa |

In Table 1, the comparative example corresponds to a glass substrate specimen strengthened only with the strengthening molten salt without the addition of the aluminum salt in the strengthening, and the embodiment (e.g., the present embodiment) corresponds to the glass substrate specimen treated by using the method of treating a glass substrate according to the embodiment of the inventive concept illustrated in FIG. 1. With respect to the comparative example, $KNO_3$ was used as the strengthening molten salt in the strengthening of the glass substrate, and the strengthening was performed at about 420° C. for about 4 hours. With respect to the embodiment, a mixed salt including the strengthening molten salt and the aluminum salt was used in the strengthening. The mixed salt included $KNO_3$ as the strengthening molten salt and $Al(NO_3)_3$ as the aluminum salt. The strengthening was performed at about 460° C. for about 4 hours.

In Table 1, the measurement depth corresponds to an indentation depth of the measurement tip when the load is applied to the test specimen using the measurement tip. As can be seen in Table 1, the surface strength of the embodiment were higher than those of the comparative example at the indentation depths of about 50 nm and about 300 nm. Thus, the method of treating a glass substrate using a mixed molten salt including an aluminum salt according to an embodiment of the inventive concept may improve the surface strength of the glass substrate.

Also, because a surface treatment layer including aluminum may be formed on the surface of the glass substrate processed by the method of treating a glass substrate according to an embodiment of the inventive concept, dissolution of alkaline ions from the surface of the glass substrate may be reduced under high-temperature and high-humidity reliability test conditions (e.g., 85° C./85% humidity), and thus, a haze phenomenon of the glass substrate may be reduced.

Because the method of treating a glass substrate according to the embodiment of the inventive concept illustrated in FIG. 1 may form the compressive stress layer and the surface treatment layer in which a relatively large amount of aluminum is distributed on the surface of the glass substrate, the method may provide a glass substrate having improved surface hardness while maintaining good strength properties.

Figure 3:
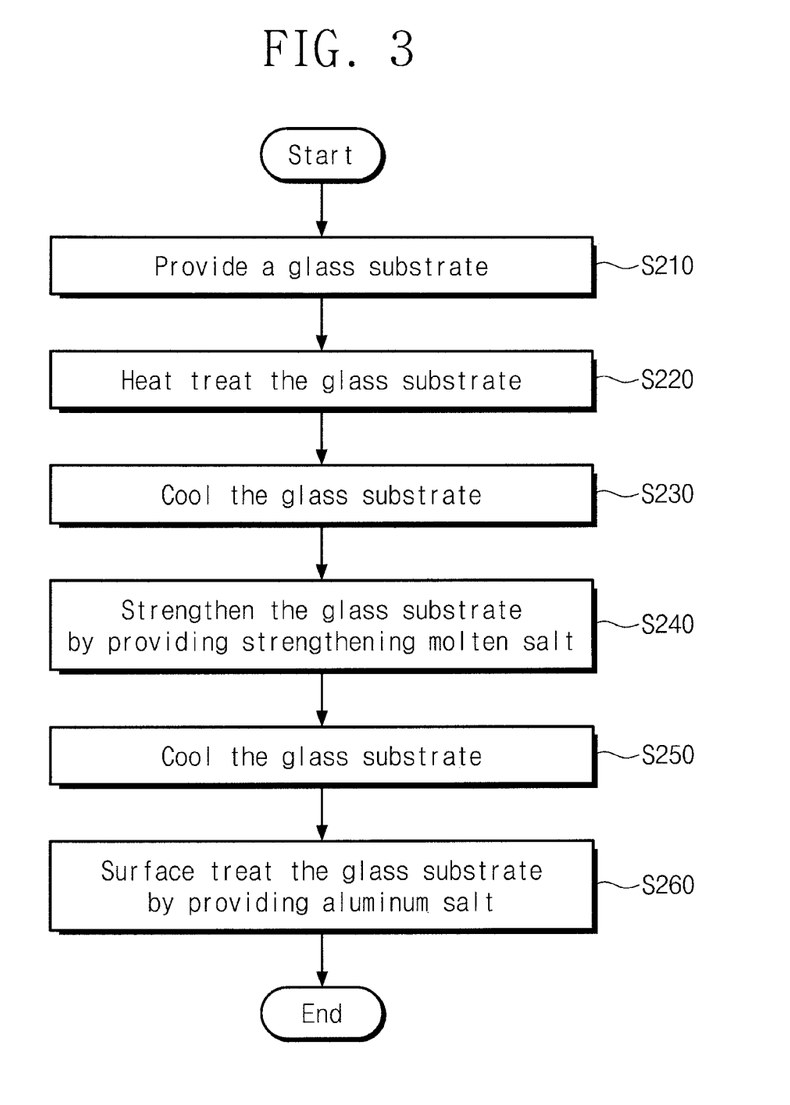
FIG. 3 is a flowchart illustrating a method of treating a glass substrate according to another embodiment of the inventive concept.

FIG. 3 is a flowchart schematically illustrating a method of treating a glass substrate according to another embodiment of the inventive concept. Hereinafter, in descriptions of the embodiment of FIG. 3, descriptions overlapping with (e.g., descriptions that are the same as or substantially the same as) those described in the above-described FIGS. 1 and 2 may be omitted and aspects that are different therefrom will be primarily described.

The method of treating a glass substrate illustrated in FIG. 3 may include providing a glass substrate (S210), strengthening the glass substrate by providing a strengthening molten salt (S240), and surface treating the glass substrate by providing an aluminum salt (S260). The glass substrate processed by the method of treating a glass substrate illustrated in FIG. 3 may be used as the cover glass CW of the display device DD illustrated in FIG. 2, but the inventive concept is not limited thereto.

The method of treating a glass substrate according to the embodiment of the inventive concept illustrated in FIG. 3 may further include heat treating the glass substrate (S220) and cooling the heat-treated glass substrate (S230) before the strengthening of the glass substrate (S240). Also, the method of treating a glass substrate according to the embodiment of the inventive concept illustrated in FIG. 3 may further include cooling the glass substrate (S250) after the strengthening of the glass substrate (S240). The method of treating a glass substrate according to the embodiment of the inventive concept illustrated in FIG. 3 may further include preheating the glass substrate before the heat treating of the glass substrate (S220).

The glass substrate provided in the providing of a glass substrate (S210) may be an alkali aluminosilicate glass substrate or a soda-lime-silicate glass substrate. For example, the provided glass substrate may include $SiO_2$, $Al_2O_3$, and/or $Na_2O$. In some embodiments, the glass substrate may include about 50 wt % to about 80 wt % of $SiO_2$, about 3 wt % to about 20 wt % of $Al_2O_3$, and about 10 wt % to about 30 wt % of $Na_2O$. Also, the glass substrate may further include an additive and/or an oxide in addition to the $SiO_2$, $Al_2O_3$, and/or $Na_2O$.

The provided glass substrate may further include $K_2O$, MgO, and/or CaO in addition to the $SiO_2$, $Al_2O_3$, and/or $Na_2O$. The glass substrate may include about 2 wt % or less of $K_2O$, about 9 wt % or less of MgO, and about 1 wt % or less of CaO. In some embodiments, the provided glass substrate may include about 50 wt % to about 80 wt % of $SiO_2$, about 3 wt % to about 10 wt % of $Al_2O_3$, about 10 wt % to about 30 wt % of $Na_2O$, about 2 wt % or less of $K_2O$, about 9 wt % or less of MgO, and about 1 wt % or less of CaO.

The heat treating of the glass substrate (S220) may be performed in the same manner, or in substantially the same manner, as the heat treating in the above-described embodiment of a method of treating a glass substrate. For example, the heat treating of the glass substrate (S220) may be performed by disposing the glass substrate in a chamber under high-temperature gas-phase conditions, or may be performed by dipping the glass substrate in a high-temperature liquid-phase melt. The heat treating of the glass substrate (S220) may be performed above a strain point of, and below an annealing point of, the provided glass substrate. For example, the heat treating of the glass substrate (S220) may be performed in a temperature range of about 500° C. to about 550° C.

By heat treating the glass substrate (S220) before the strengthening of the glass substrate (S240) according to an embodiment of the inventive concept, surface properties of the glass substrate may be modified, and an internal structure of the glass substrate may be hardened (e.g., may be made more dense). Also, strength properties of the glass substrate may be improved.

The strengthening of the glass substrate (S240) by providing the strengthening molten salt may include strengthening the glass substrate by a chemical strengthening method. For example, the strengthening molten salt used in the strengthening of the glass substrate (S240) may be a single salt. In some embodiments, the strengthening molten salt may be a single salt of $Li^+$, $Na^+$, $K^+$, $Rb^+$, or $Cs^+$. For example, the strengthening molten salt may be a single salt including any one of $LiNO_3$, $NaNO_3$, $KNO_3$, $RbNO_3$, $Li_2SO_4$, $Na_2SO_4$, $K_2SO_4$, or $Rb_2SO_4$.

However, the inventive concept is not limited thereto, and the strengthening molten salt may be a mixed salt. In an embodiment in which the strengthening molten salt is the mixed salt, the strengthening molten salt may include a plurality of kinds of ions including $Li^+$, $Na^+$, $K^+$, $Rb^+$, and/or $Cs^+$. For example, the strengthening molten salt may be a mixed salt including $LiNO_3$, $NaNO_3$, $KNO_3$, $Li_2SO_4$, $Na_2SO_4$, and/or $K_2SO_4$.

In the strengthening of the glass substrate (S240), the strengthening molten salt may be maintained at a first temperature. The first temperature may be below the strain point of the provided glass substrate. For example, the first temperature may be in a range of about 350° C. to about 500° C. The first temperature may be a temperature that is lower than the temperature of the heat treating of the glass substrate (S220).

The method of treating a glass substrate according to an embodiment of the inventive concept may further include the surface treating of the glass substrate (S260). The surface treating of the glass substrate (S260) may improve surface hardness of the glass substrate by providing an aluminum salt to the strengthened glass substrate.

The aluminum salt used in the surface treatment of the glass substrate (S260) may be a salt which is melted to provide an aluminum ion. For example, the aluminum salt may include aluminum nitrate ($Al(NO_3)_3$), aluminum sulfate ($Al_2(SO_4)_3$), and/or aluminum chloride ($AlCl_3$). The method of treating a glass substrate according to an embodiment of the inventive concept including the surface treating of the glass substrate (S260) may improve the surface hardness of the glass substrate by providing the aluminum salt after the strengthening of the glass substrate (S240). For example, because a surface treatment layer including aluminum may be formed by treating the surface of the glass substrate with the aluminum salt, scratch resistance of the surface of the glass substrate may be improved.

In the surface treating of the glass substrate (S260), the aluminum salt may be maintained at a second temperature. The second temperature may be below the first temperature, (e.g., the temperature of the strengthening molten salt in the strengthening of the glass substrate (S240)). The second temperature may be greater than a melting point of the aluminum salt, and may be below a melting point of the strengthening molten salt. For example, the second temperature may be in a range of about 150° C. to about 350° C.

The method of treating a glass substrate according to an embodiment of the inventive concept may improve the surface hardness of the glass substrate without reducing the strength of the surface of the glass substrate by including the surface treating of the glass substrate (S260), which is performed at a temperature that is below the melting temperature of the strengthening molten salt used in the strengthening of the glass substrate (S240). For example, the method of treating a glass substrate according to an embodiment of the inventive concept may improve the scratch resistance of the glass substrate by maintaining compressive stress (CS) of a compressive stress layer formed on the surface of the glass substrate and a thickness (DOL) of the compressive stress layer while also improving the surface hardness of the glass substrate.

The method of treating a glass substrate according to an embodiment of the inventive concept may further include the cooling of the glass substrate (S230) initially after the heat treating of the glass substrate (S220) and again cooling of the glass substrate (S250) after the strengthening of the glass substrate (S240). During the cooling of the glass substrate (S230, S250), the glass substrate may be slowly cooled. For example, in the cooling of the glass substrate (S230, S250), the glass substrate may be cooled to room temperature, but the inventive concept is not limited thereto. The method of treating a glass substrate may further include cleaning the glass substrate and/or drying the glass substrate after one or both processes of cooling of the glass substrate (S230, S250).

Figure 4:
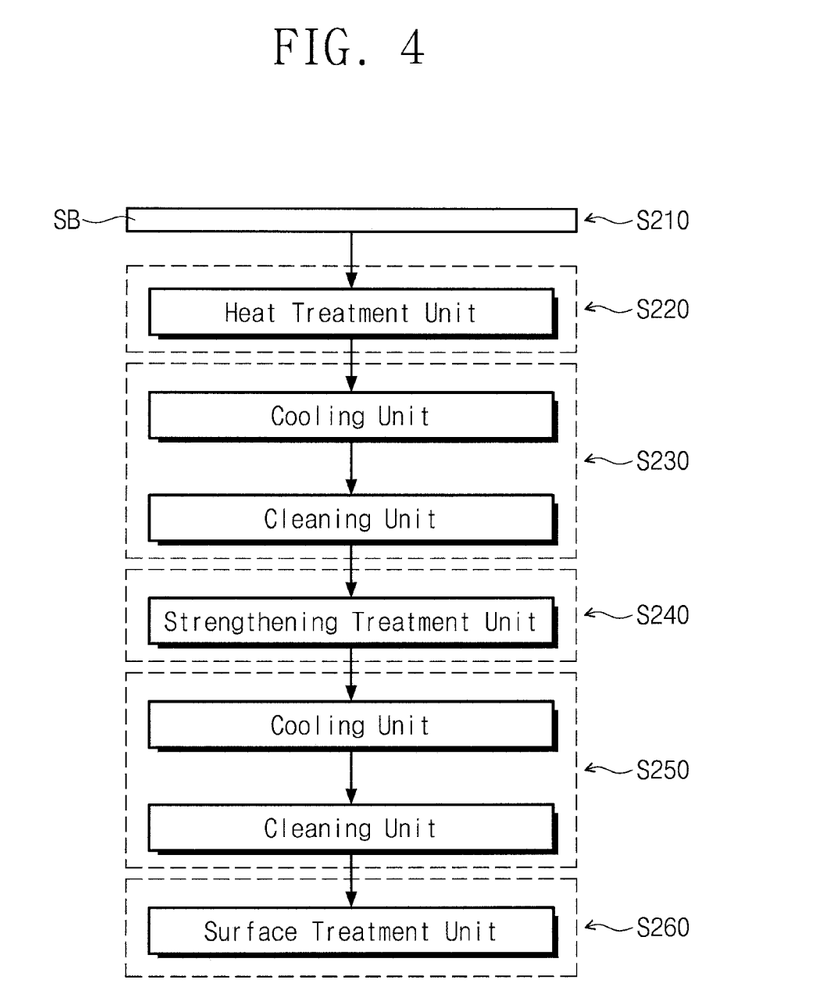
FIG. 4 is a block diagram schematically illustrating the embodiment of the method of treating a glass substrate illustrated in FIG. 3.

FIG. 4 is a block diagram schematically illustrating processes in the method of treating a glass substrate according to the embodiment of the inventive concept illustrated in FIG. 3. In FIG. 4, units configured to perform the providing of a glass substrate (S210), the heat treating of the glass substrate (S220), the cooling of the glass substrate (S230), the strengthening of the glass substrate (S240), the cooling of the glass substrate (S250), and the surface treating of the glass substrate (S260), which correspond to the processes illustrated in the flowchart of FIG. 3, are represented by blocks. The glass substrate is provided to a heat treatment unit and, after being heat-treated in the heat treatment unit, is transferred to a strengthening treatment unit through a cooling unit and a cleaning unit. Thereafter, the strengthened glass substrate is transferred to a surface treatment unit through another cooling unit and another cleaning unit, or may be transferred to the surface treatment unit by again passing through the same cooling unit and/or the same cleaning unit described above. The heat treatment unit, the cooling unit, the cleaning unit, the strengthening treatment unit, and the surface treatment unit, in which the method of treating a glass substrate according to an embodiment of the inventive concept is performed, may be separate, independent units. However, the inventive concept is not limited thereto, and the units may operate in conjunction with each other. Also, some of the units may be provided as an integrated unit.

Figure 5:
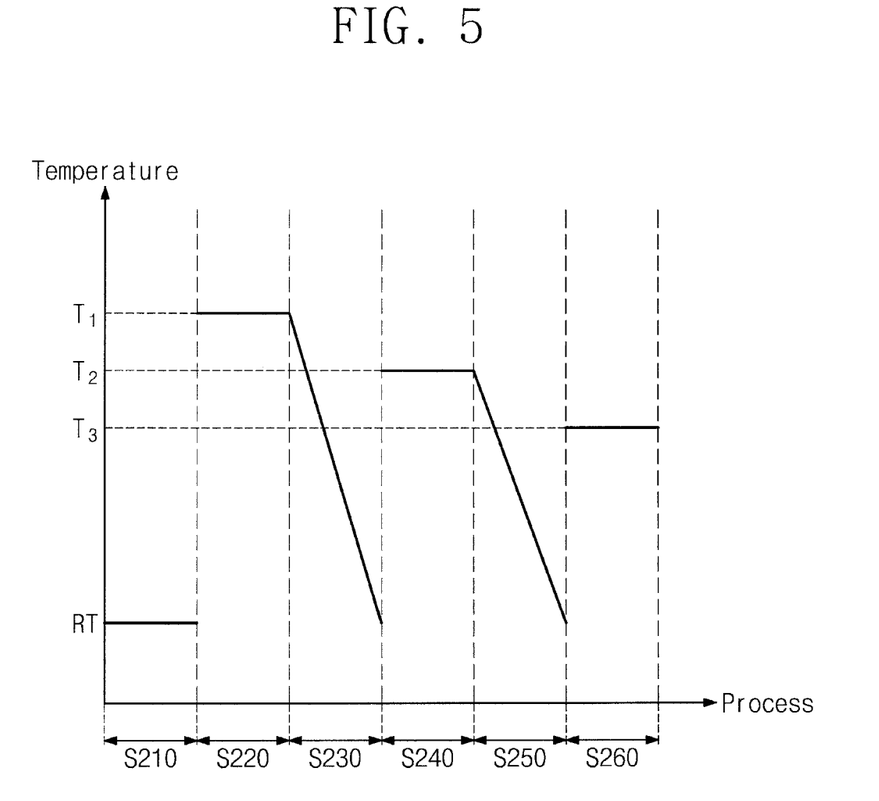
FIG. 5 schematically illustrates a temperature profile at each part of the method of treating a glass substrate according to the embodiment illustrated in FIG. 3.

FIG. 5 schematically illustrates a temperature profile of the glass substrate according to processes of treating the glass substrate according to an embodiment of the inventive concept. FIG. 5 illustrates the temperature profile of the glass substrate in each of the processes of the embodiment of the inventive concept illustrated in FIG. 3. For example, FIG. 5 schematically illustrates changes in temperature of the glass substrate at each process, and a ratio illustrated in FIG. 5 does not directly refer to the actual process temperature in each of the processes.

Referring to FIG. 5, in the providing of a glass substrate (S210), the glass substrate may be at room temperature (RT). The glass substrate may be an alkali aluminosilicate glass substrate or a soda-lime-silicate glass substrate. Thereafter, the heat treating of the glass substrate (S220) may be performed at a temperature $T_1$. For example, the temperature of the glass substrate may be maintained at the temperature $T_1$ during the heat treatment of the glass substrate. The temperature $T_1$ may be a temperature that is above the strain point of the glass substrate and below the annealing point of the glass substrate. For example, the temperature $T_1$ may be in a range of about 500° C. to about 550° C. For example, the temperature $T_1$ may be a temperature of the melt in which the glass substrate is dipped in the heat treating (S220). Before the heat treating of the glass substrate (S220), the glass substrate may be preheated, and, in such an embodiment, the preheating may be performed at a temperature lower than the temperature $T_1$. For example, the preheating may be performed in a temperature range of about 150° C. to about 300° C.

In the cooling of the glass substrate (S230), the temperature of the glass substrate may be gradually decreased from the temperature $T_1$. For example, the cooling (S230) may include slowly cooling the glass substrate. The cooling (S230) may be performed by providing the glass substrate at room temperature (e.g., by providing the glass substrate at a room temperature environment) or may be provided by (e.g., controlled in) a separate cooling unit. Referring to FIG. 5, the temperature of the glass substrate in the cooling (S230) is decreased to room temperature RT, but the inventive concept is not limited thereto. For example, in the cooling of the glass substrate (S230), the cooling temperature of the glass substrate may be controlled so that the glass substrate is cooled to a temperature higher than the room temperature RT.

In the strengthening of the glass substrate (S240), the glass substrate may be maintained at a temperature $T_2$. The temperature $T_2$ may be about 100° C. to about 150° C. lower than the temperature $T_1$. For example, the temperature $T_2$ may be in a range of about 350° C. to about 500° C. The temperature $T_2$ may be the temperature of the strengthening molten salt which strengthens the glass substrate. It has been illustrated in FIG. 5 that the temperature in the strengthening of the glass substrate (S240) is maintained at the temperature $T_2$, but the inventive concept is not limited thereto. In some embodiments, the temperature $T_2$ may be changed in the strengthening of the glass substrate (S240). For example, in an embodiment in which the strengthening (S240) is performed in multiple strengthening processes, a temperature of each of the strengthening processes may be differently controlled.

After the strengthening of the glass substrate (S240), the cooling of the glass substrate (S250) and the surface treating of the glass substrate by providing the aluminum salt (S260) may be performed. In the cooling of the glass substrate (S250), the temperature of the glass substrate may be gradually decreased from the temperature $T_2$. For example, the cooling (S250) may include slowly cooling the glass substrate. The cooling (S250) may be performed by providing the glass substrate at the room temperature RT (e.g., providing the glass substrate at a room temperature environment) or may be controlled in a separate cooling unit. Referring to FIG. 5, the temperature of the glass substrate in the cooling (S250) is decreased to the room temperature RT, but the inventive concept is not limited thereto.

In the surface treating of the glass substrate (S260), the temperature of the glass substrate may be maintained at a temperature $T_3$. The temperature $T_3$ may be lower than the temperature $T_2$. For example, the temperature $T_3$ may be in a range of about 150° C. to about 350° C. The temperature $T_3$ may be the temperature of the aluminum salt for the surface treatment of the glass substrate. In FIG. 5, the temperature in the surface treating of the glass substrate (S260) is maintained at the temperature $T_3$, but the inventive concept is not limited thereto.

Although a temperature profile for the method of treating a glass substrate according to the embodiment of the inventive concept illustrated in FIG. 1 is not separately illustrated, the temperature profile for the method of treating a glass substrate according to the embodiment of the inventive concept illustrated in the above-described FIG. 1 may have the same tendencies (e.g., variations or changes) as the temperature profile from S210 to S240 in FIG. 5. For example, the providing of a glass substrate (S110) of FIG. 1 may correspond to S210 of FIG. 5, and the strengthening of the glass substrate (S130) of FIG. 1 may correspond to S240 of FIG. 5. Also, in an embodiment in which the glass substrate is heat treated, the heat treating may correspond to S220 of FIG. 5.

Figure 6:
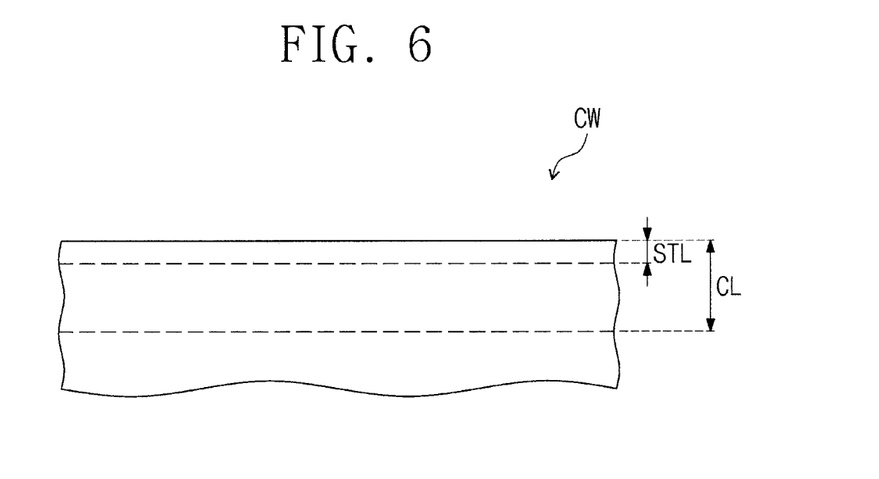
FIG. 6 schematically illustrates a cross section of a glass substrate treated according to the embodiment of the method of treating a glass substrate illustrated in FIG. 3.

FIG. 6 schematically illustrates a cross section of a glass substrate that has been processed by the method of treating a glass substrate according to the embodiment of the inventive concept illustrated in FIG. 1 or 3. The glass substrate illustrated in FIG. 6 may correspond to the cover glass CW in the display device DD illustrated in FIG. 2; however, the inventive concept is not limited thereto.

The cover glass (CW) treated by the method of treating a glass substrate according to an embodiment of the inventive concept may include a compressive stress layer CL on the surface thereof. Also, an outermost surface of the cover glass CW, which is exposed to the outside, may include a surface treatment layer STL. The surface treatment layer STL is included in (or on) the compressive stress layer CL and may be a layer exposed to the outside (e.g., the surface treatment layer STL may be an outermost layer of the compressive stress layer CL). The surface treatment layer STL may be a portion of the compressive stress layer CL (e.g., an aluminum rich layer) including a relatively large amount of aluminum (e.g., including a relatively large amount of aluminum compared to the other portions of the compressive stress layer CL).

For example, a thickness of the compressive stress layer CL may be in a range of about 30 μm (30,000 nm) to about 45 μm (45,000 nm), and a thickness of the surface treatment layer (STL) may be in a range of about 70 nm to about 200 nm. However, the inventive concept is not limited thereto, and the thickness of the compressive stress layer CL may be suitably varied according to conditions of the strengthening. Also, the thickness of the surface treatment layer (STL) may be suitable varied according to treatment conditions of the aluminum salt. Although FIG. 6 illustrates only a portion of the cover glass CW, the compressive stress layer CL and the surface treatment layer STL may be formed on the entire surface of the processed cover glass CW.

The method of treating a glass substrate according to embodiments of the inventive concept may improve the surface hardness, while maintaining the strength properties, of the glass substrate by strengthening the glass substrate with an aluminum salt and/or by surface treating the glass substrate with the aluminum salt after the strengthening of the glass substrate.

A method of treating a glass substrate according to embodiments of the inventive concept may improve surface hardness of the glass substrate by strengthening the glass substrate with an aluminum salt as well as a mixed strengthening molten salt.

A method of treating a glass substrate according to embodiments of the inventive concept may improve surface hardness of the glass substrate by surface treating the glass substrate with an aluminum salt after strengthening the glass substrate.

Although embodiments of the present invention have been described with reference to exemplary embodiments thereof, it will be appreciated by those skilled in the art that it is possible to modify and change the described embodiments and the present invention in various suitable ways without departing from the spirit and scope of the present invention as set forth in the following claims and their equivalents, such that the scope of the present invention is defined not by the detailed description of the invention, but by the appended claims and their functional equivalents.

What is claimed is:

1. A method of treating a glass substrate, the method comprising:
   strengthening a glass substrate by providing a mixed molten salt comprising a strengthening molten salt and an aluminum salt to the glass substrate,
   wherein an amount of the aluminum salt in the mixed molten salt is 100 ppm to 1,000 ppm based on a weight of the strengthening molten salt.

2. The method of claim 1, wherein the glass substrate comprises 50 wt % to 80 wt % of $SiO_2$, 3 wt % to 20 wt % of $Al_2O_3$, and 10 wt % to 30 wt % of $Na_2O$.

3. The method of claim 1, wherein the aluminum salt comprises at least one of an aluminum nitrate, an aluminum sulfate, or an aluminum chloride.

4. The method of claim 1, wherein the strengthening molten salt is a single salt of $Li^+$, $Na^+$, $K^+$, $Rb^+$, or $Cs^+$.

5. The method of claim 1, further comprising heat treating the glass substrate before the strengthening of the glass substrate.

6. The method of claim 5, wherein the heat treating is performed above a strain point of the glass substrate and below an annealing point of the glass substrate.

7. The method of claim 5, wherein the heat treating is performed by dipping the glass substrate in a melt.

8. The method of claim 7, wherein the melt comprises an alkali nitrate, an alkali sulfate, or an alkali chloride.

* * * * *